US008618237B2

(12) United States Patent
Booth et al.

(10) Patent No.: US 8,618,237 B2
(45) Date of Patent: Dec. 31, 2013

(54) NON-CRYSTALLIZING BIS-OXAZOLIDINES

(75) Inventors: Kirk Booth, Chorley (GB); Neil Carter, Ainsdale (GB); Ian Martin, Barrow (GB); Len Daniels, Leyland (GB)

(73) Assignee: Sika Technology AG, Baar (CH)

( * ) Notice: Subject to any disclaimer, the term of this patent is extended or adjusted under 35 U.S.C. 154(b) by 0 days.

(21) Appl. No.: 13/460,283

(22) Filed: Apr. 30, 2012

(65) Prior Publication Data

US 2012/0277382 A1 Nov. 1, 2012

Related U.S. Application Data

(63) Continuation of application No. PCT/EP2010/065998, filed on Oct. 22, 2010.

(30) Foreign Application Priority Data

Oct. 30, 2009 (EP) .................................... 09174683

(51) Int. Cl.
*C08G 18/38* (2006.01)
*C08G 18/76* (2006.01)

(52) U.S. Cl.
USPC ................ 528/73; 528/74; 525/452; 525/460

(58) Field of Classification Search
USPC .............................. 528/73, 74; 525/452–460
See application file for complete search history.

(56) References Cited

U.S. PATENT DOCUMENTS 3,661,923 A 5/1972 Emmons et al.
4,002,601 A 1/1977 Hajek et al.
4,504,647 A * 3/1985 Zabel et al. .................... 528/68
5,126,421 A 6/1992 Majewski et al.
5,189,176 A 2/1993 Blum et al.
5,219,979 A 6/1993 Greco
5,506,329 A * 4/1996 Chou et al. ..................... 528/60
5,747,627 A 5/1998 Kimura et al.
5,977,285 A 11/1999 Ernst Moos et al.
6,271,334 B1 8/2001 Moos et al.
6,545,117 B1 4/2003 Moos et al.
7,115,705 B2 * 10/2006 Nagai et al. .................. 528/390

FOREIGN PATENT DOCUMENTS

EP 0 499 188 A1 8/1992
GB 1 292 455 10/1972
GB 1 463 944 A 2/1977
WO WO 96/08308 A1 3/1996
WO WO 99/07762 A1 2/1999

OTHER PUBLICATIONS

International Search Report (PCT/ISA/210) issued on Dec. 9, 2010, by the European Patent Office as the International Searching Authority for International Application No. PCT/EP2010/065998.
Written Opinion (PCT/ISA/237) issued on Dec. 9, 2010, by the European Patent Office as the International Searching Authority for International Application No. PCT/EP2010/065998.

* cited by examiner

*Primary Examiner* — Mike M Dollinger
(74) *Attorney, Agent, or Firm* — Buchanan Ingersoll & Rooney PC

(57) ABSTRACT

Non-crystallizing oxazolidines as curing agents for polyisocyanates and polyurethanes. The curing agents are mixtures of at least one polyoxazolidine POU having at least two urethane groups and at least one polyoxazolidine POC having at least one carbonato group.

24 Claims, No Drawings

NON-CRYSTALLIZING BIS-OXAZOLIDINES

RELATED APPLICATIONS

This application claims priority as a continuation application under 35 U.S.C. §120 to PCT/EP2010/065998, which was filed as an International Application on Oct. 22, 2010 designating the U.S., and which claims priority to European Application No. 09174683.4 filed in Europe on Oct. 30, 2009. The entire contents of these applications are hereby incorporated by reference in their entireties.

FIELD

This disclosure relates to the field of oxazolidine curing agents for polyisocyanates and polyurethanes.

BACKGROUND INFORMATION

Oxazolidines, particularly bis-oxazolidines, are well known as curing agents for polyurethanes. Particularly useful as curing agents are bis-oxazolidines which are linked by urethane groups, disclosed, for example, in U.S. Pat. No. 5,747,627, U.S. Pat. No. 5,189,176 and GB Patent Document No. 1 463 944.

A further class of oxazolidines are bis-oxazolidines which are linked by carbonato groups. Such bis-oxazolidines are disclosed, for example, in EP Patent Document No. 0 499 188 A1.

A further class of oxazolidines are bicyclic oxazolidines which are disclosed, for example, in U.S. Pat. No. 5,126,421, International Publication No. WO 96/08308 A1, International Publication No. WO 99/07762 A1 and GB Patent Document No. 1 292 455.

Polyoxazolidines in general, and particularly polyoxazolidines having urethane groups, however, tend to crystallize. This is very disadvantageous in view of storage, transport and application of these compounds. There have been several approaches to solve this problem. The use of solvents show disadvantages such as impairment of mechanical properties and release of solvents such as volatile organic compounds (VOC).

U.S. Pat. No. 5,189,176 suggests a non-crystallising bisoxazolidine having two urethane groups linked together by a hexamethylene group and having a hydrocarbon substituent with 5 to 8 carbon atoms attached to the carbon located between the oxygen and nitrogen atom of the oxazolidine ring. However, this very narrow group of chemical compounds is very restrictive in the choice of suitable properties of polyoxazolidines.

SUMMARY

According to an exemplary aspect, a composition is disclosed, comprising: a) at least one polyoxazolidine POU having at least two urethane groups; and b) at least one polyoxazolidine POC having at least one carbonato group.

According to another exemplary aspect, a method of using a composition as a non-crystallizing curing agent of a polyisocyanate is disclosed, the method comprising adding a composition to a polyisocyanate, wherein the composition comprises: a) at least one polyoxazolidine POU having at least two urethane groups; and b) at least one polyoxazolidine POC having at least one carbonato group.

Disclosed are non-crystallising polyoxazolidines that provide a broad choice of properties of polyoxazolidines.

In an exemplary embodiment, these polyoxazolidines are not based on solvents and, therefore, can be ecologically and economically advantageous. An exemplary advantage is that a broad range of existing crystallizing polyoxazolidines can be modified to yield non-crystallizing polyoxazolidine compositions. This allows for the possibility to tailor the curing properties to the customers' needs.

DETAILED DESCRIPTION

Disclosed in a first aspect is a composition comprising:

a) at least one polyoxazolidine POU having at least two urethane groups and b) at least one polyoxazolidine POC having at least one carbonato group.

All bold indications in this document such as POU, POC, BCO or the like are used only for informative purposes and serve only to aid understanding and identification.

The term "urethane groups" shall mean in the present document a group of the formula (a):

(a)

Dotted lines indicate in the present document the binding site to other substituents.

The term "carbonato group" shall mean in the present document a group of the formula (b):

(b)

The term "room temperature" shall mean in the present document a temperature of 25° C.

The term "bicyclic polyoxazolidine" shall mean in the present document a compound having two oxazolidines ring which are fused together, in other words a compound comprising the structural element of the formula (c)

(c)

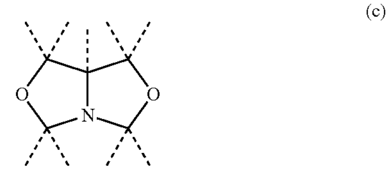

The term "consists essentially of" shall mean in the present document that, apart from the mentioned components, only minor amounts, for example, less than 5% by weight, for example, less than 1% by weight, of other ingredients are present.

The term "polyurethane" shall mean any product of the addition reaction of polyisocyanate and polyols and/or polymercaptans and eventually water, independently whether some isocyanate groups remain or not. For example, the so-called polyurethane prepolymers, which are curable by humidity due to the isocyanate groups, are also regarded as polyurethanes as well as, for example, the completely cured polymer having essentially no NCO groups left.

The exemplary composition comprises at least one polyoxazolidine POU having at least two urethane groups.

For example, the polyoxazolidine POU having at least two urethane groups has a structure according to formula (I), for example, formula (Ia):

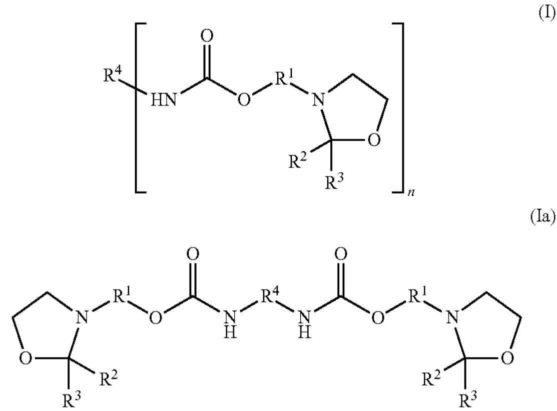

wherein

- $R^1$ is an alkylene group with 2 to 5 carbon atoms, for example, an ethylene group;
- $R^2$ and $R^3$ are, individually, H or a linear or branched alkyl group with 1 to 10 carbon atoms or an aryl group which is optionally substituted;
- $R^4$ is a n-valent residue of a polyisocyanate of the molecular weight of 150-4000 g/mol, for example, of 160-1000 g/mol, after removal of n isocyanate groups; and
- n=2, 3, 4, 5 or 6.

For example, n stands for a value of 2, i.e., the polyoxazolidine POU can be bis-oxazolidine.

The substituent $R^4$ can be selected from, for example:

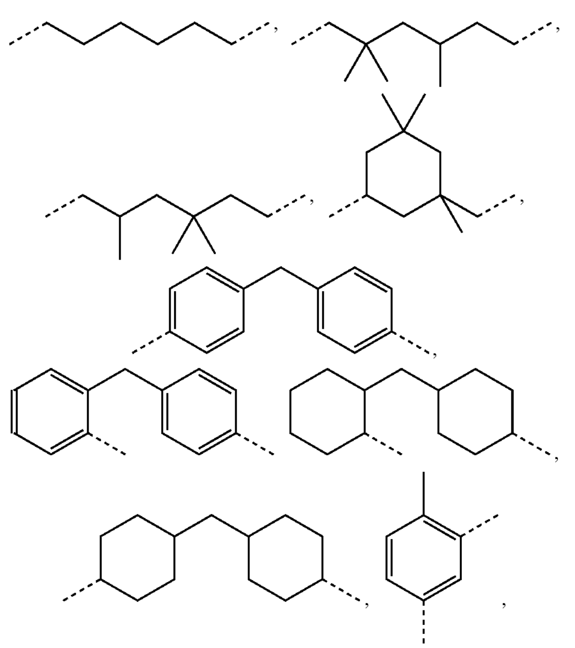

-continued

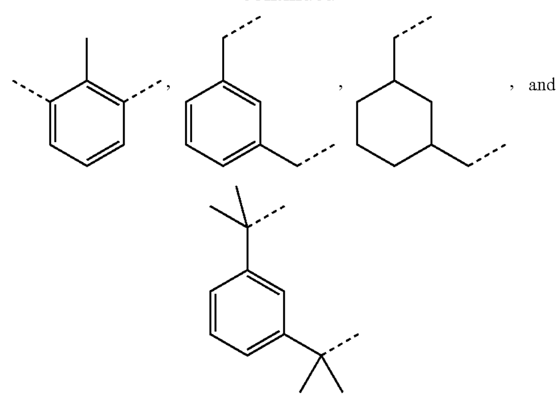

or the isocyanurates or biurets or uretdiones of the corresponding diisocyanates thereof.

Those substituents $R^4$ originating from isocyanurates or biurets or uretdiones of the corresponding diisocyanates can have one of the following structural formulas:

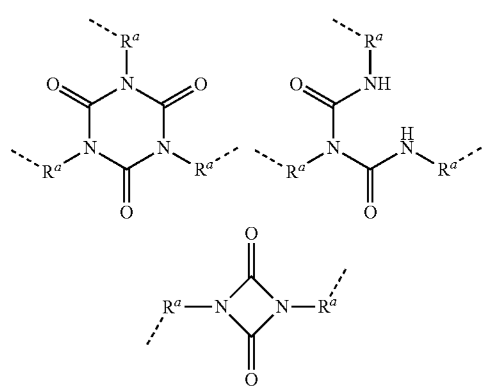

In these formulas, $R^a$ stands for the corresponding diisocyanate after removal of the two NCO groups.

For example, the substituent $R^4$ can be selected from 1,6-hexamethylene diisocyanate (HDI), 1-isocyanato-3,3,5-trimethyl-5-isocyanatomethylcyclohexane (isophorone diisocyanate or IPDI), 2,4-toluene diisocyanate, 2,6-toluene diisocyanate and the isocyanurates or biurets or uretdiones thereof after removal of n NCO groups.

The polyoxazolidine POU having at least two urethane groups can be prepared by a reaction of a polyisocyanate, for example, a polyisocyanate of formula (IA), and an oxazolidine having a substituent carrying a hydroxyl group, for example, an oxazolidine of formula (IB), for example, of formula (IB-1).

$$R^4\text{-}[NCO]_n \qquad (IA)$$

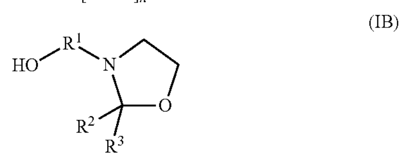

-continued (IB-1)

The oxazolidine having a substituent carrying a hydroxylic group can be made from a condensation reaction of an N-hydroalkylethanolamine, for example, of a diethanolamine, and the corresponding ketone $R^2COR^3$, respectively and for example, the corresponding aldehyde $HCOR^3$.

Suitable polyisocyanates of formula (IA) can be selected from 1,6-hexamethylene diisocyanate (HDI), 2-methylpentamethylene 1,5-diisocyanate, 2,2,4- and 2,4,4-trimethyl-1,6-hexamethylene diisocyanate (TMDI), 1,10-decamethylene diisocyanate, 1,12-dodecamethylene diisocyanate, lysine diisocyanate and lysine ester diisocyanate, cyclohexane 1,3- and 1,4-diisocyanate and any desired mixtures of these isomers, 1-methyl-2,4- and -2,6-diisocyanatocyclohexane and any desired mixtures of these isomers (HTDI or $H_6$TDI), 1-isocyanato-3,3,5-trimethyl-5-isocyanatomethylcyclohexane (=isophorone diisocyanate or IPDI), perhydro-2,4'- and -4,4'-diphenylmethane diisocyanate (HMDI or $H_{12}$MDI), 1,4-di-isocyanato-2,2,6-trimethylcyclohexane (TMCDI), 1,3- and 1,4-bis(isocyanato-methyl)cyclohexane, m- and p-xylylene diisocyanate (m- and p-XDI), m- and p-tetramethyl-1,3- and -1,4-xylylene diisocyanate (m- and p-TMXDI), bis(1-isocyanato-1-methylethyl)naphthalene, 2,4- and 2,6-toluene diisocyanate (TDI), 4,4'-, 2,4'- and 2,2'-diphenylmethane diisocyanate (MDI), 1,3- and 1,4-phenylene diisocyanate, 2,3,5,6-tetramethyl-1,4-diisocyanatobenzene, naphthalene 1,5-diisocyanate (NDI), 3,3'-dimethyl-4,4'-diisocyanatodiphenyl (TODD, dianisidine diisocyanate (DADI), oligomers and polymers of the aforementioned isocyanates, and any desired mixtures of the aforementioned isocyanates. In an exemplary embodiment, the polyisocyanate can include monomeric diisocyanates such as MDI, TDI, HDI, $H_{12}$MDI and IPDI.

The polyisocyanate of formula (IA) can be selected from, for example, the isocyanurates or biurets or uretdiones of the aforementioned polyisocyanates.

The polyisocyanate of formula (IA) can be selected from, for example, the isocyanate groups carrying polyurethane prepolymers being a reaction product of aforementioned polyisocyanates with polyols and/or polyamines.

The polyisocyanate of formula (IA) can be selected from, for example, 1,6-hexamethylene diisocyanate (HDI), 1-isocyanato-3,3,5-trimethyl-5-isocyanatomethylcyclohexane (isophorone diisocyanate or IPDI), 2,4-toluene diisocyanate, 2,6-toluene diisocyanate.

The polyisocyanates can be selected from, for example, diisocyanates such as, for example, HDI and TDI.

Examples include polyoxazolidines PUC which are bis-oxazolidines of formula (IV) or (IV'):

(IV)

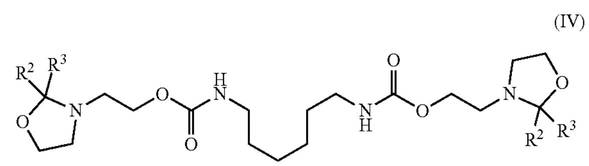

-continued (IV')

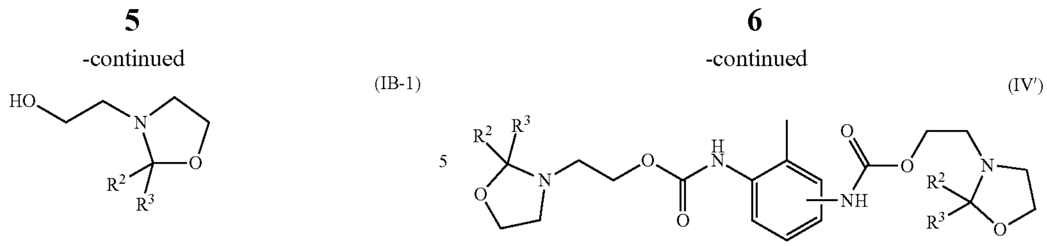

$R^2$ and $R^3$ being already defined above. In an exemplary embodiment, $R^2$ represents H.

The above described polyoxazolidines POU having at least two urethane groups can be liquids at room temperature, which tend to otherwise crystallize on storage at low temperature. For example, the crystallization can occur within less than 1 week's time at a temperature of 4° C. Crystallization seeds can accelerate this crystallization process.

The exemplary composition comprises at least one polyoxazolidine POC having at least one carbonato group.

For example, the polyoxazolidine POC having at least one carbonato group has a structure according to formula (II), for example, formula (IIa):

(II)

(IIa)

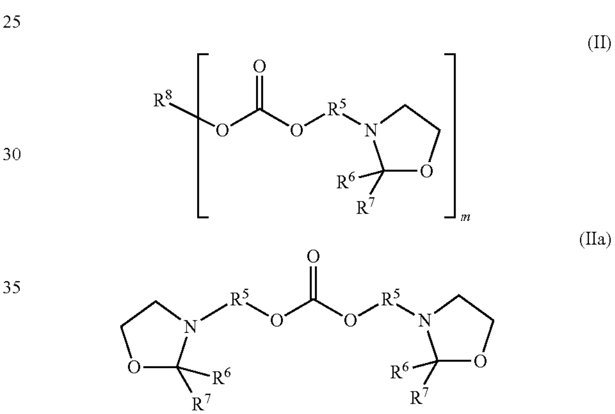

wherein $R^5$ is an alkylene group with 2 to 5 carbon atoms, for example, an ethylene group;

$R^6$ and $R^7$ are, individually, H or a linear or branched alkyl group with 1 to 6 carbon atoms or an aryl group which is optionally substituted;

m=1, 2, 3, 4, 5 or 6;

$R^8$ is a m-valent residue of the molecular weight of 15-1000 g/mol, for example, carrying a substituent of the formula (III)

(III)

For example, n stands for a value of 2, for example, the polyoxazolidine POC can be a bis-oxazolidine.

The polyoxazolidine POC can be prepared by a reaction of an organic carbonate, eventually a polyol, for example, a polyol of formula (II A), an oxazolidine having a substituent carrying a hydroxyl group, for example, an oxazolidine of formula (II B), for example, of formula (II B-1):

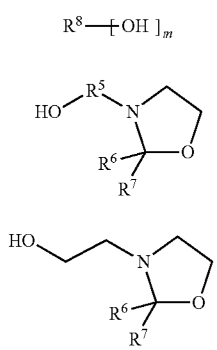

The details of this reaction and the products thereof formed are described in EP Patent Document No. 0 499 188 A1, the entire disclosure of which is hereby incorporated by reference.

Suitable polyols of formula (IA) can be selected from, for example, 1,2-ethanediol, diethylene glycol, 1,2-propanediol, dipropylene glycol, 1,4-butanediol, 1,5-pentanediol, 1,6-hexanediol, 1,7-heptanediol, octanediol, nonanediol, decanediol, neopentyl glycol, pentaerythritol (=2,2-bis(hydroxymethyl)-1,3-propanediol), dipentaerythritol (=3-(3-hydroxy-2,2-bishydroxymethylpropoxy)-2,2-bishydroxymethylpropan-1-01), glycerol (=1,2,3-propanetriol), trimethylolpropane (=2-ethyl-2-(hydroxymethyl)-1,3-propanediol), trimethylolethane (=2-(hydroxymethyl)-2-methyl-1,3-propanediol), di(trimethylolpropane) (=3-(2,2-bis(hydroxymethyl)butoxy)-2-ethyl-2-hydroxymethylpropan-1-ol), di(trimethylolethane) (=3-(3-hydroxy-2-hydroxymethyl-2-methylpropoxy)-2-hydroxymethyl-2-methylpropan-1-ol), diglycerol (=bis(2,3-dihydroxypropyl)ether; cyclohexane-1,2-diyldimethanol, cyclohexane-1,3-diyldimethanol, cyclohexane-1,4-diyldimethanol, 1,2-cyclohexanediol, 1,3-cyclohexanediol, 1,4-cyclohexanediol, 1,3,5-tris(2-hydroxyethyl)-1,3,5-triazinane-2,4,6-trione, 2,2',2"-nitrilotriethanol; (poly)ethylene glycols, (poly)propylene glycols and (poly)butylene glycol (=poly(oxy-1,4-butanediyl)-α-hydro-ω-hydroxyl).

The oxazolidine having a substituent carrying a hydroxyl group can be made from a condensation reaction of an N-hydroxyalkylethanolamine, for example, a diethanolamine, and the corresponding ketone $R^6COR^7$ respectively and, for example, the corresponding aldehyde $HCOR^7$.

Exemplary polyoxazolidines POC are those which are selected from:

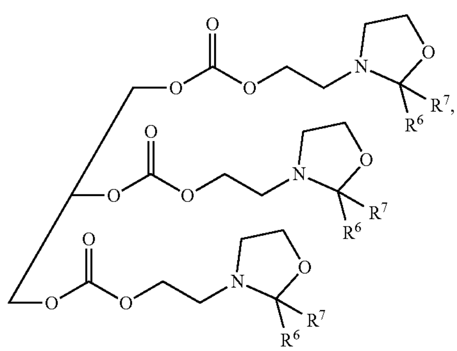

-continued

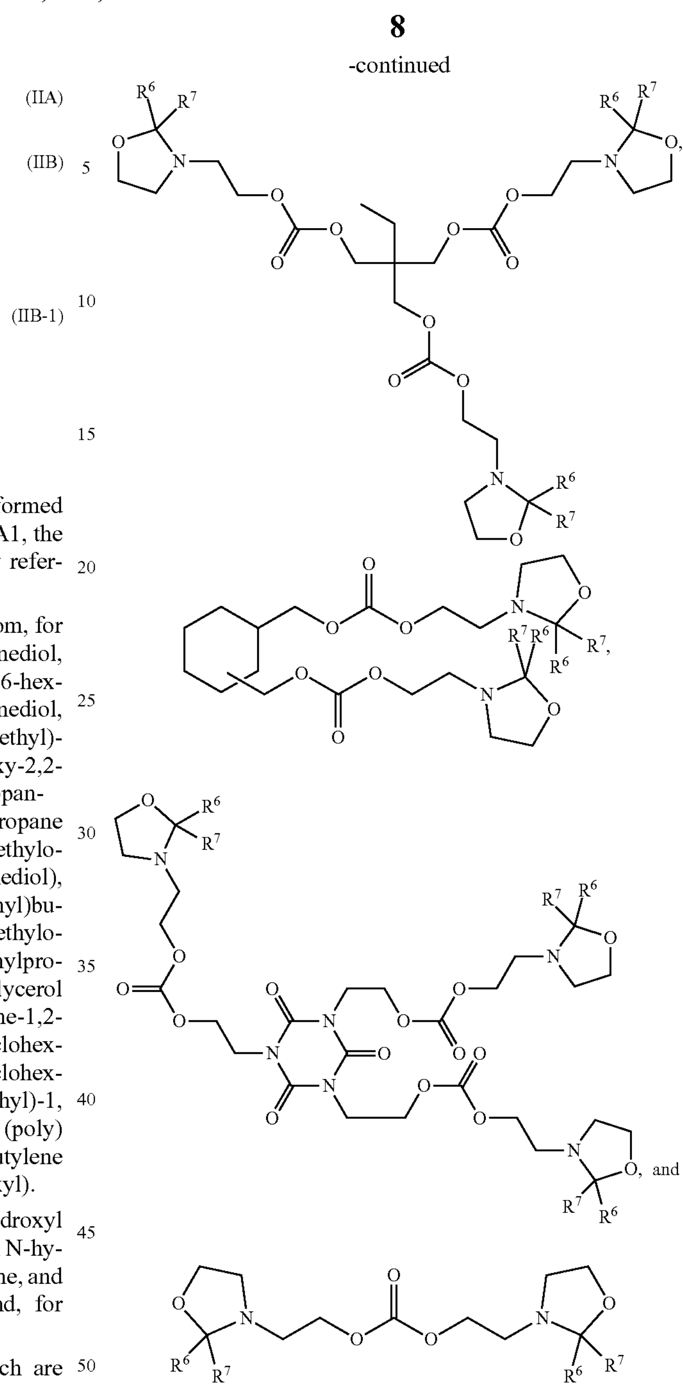

wherein $R^6$ and $R^7$ are, individually, H or a linear or branched alkyl group with 1 to 10 carbon atoms or an aryl group which is optionally substituted, for example, a methyl, ethyl or isopropyl group.

An exemplary composition comprises:

a) at least one polyoxazolidine POU having at least two urethane groups and b) at least one polyoxazolidine POC having at least one carbonato group.

The composition can comprise or consists of a polyoxazolidine PUC which is a bis-oxazolidine of formula (IV) or (IV') and a polyoxazolidine POC which is a bis-oxazolidine of formula (V)

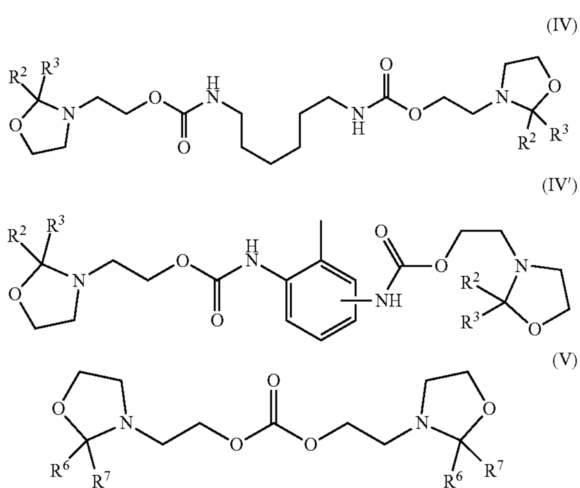

wherein $R^2$, $R^3$, $R^6$ and $R^7$ represent independently from each other H or a linear or branched alkyl group with 1 to 10 carbon atoms, for example, a methyl, ethyl or isopropyl group, for example, an isopropyl group.

In an exemplary embodiment, $R^2$ and $R^6$ are H.

In an exemplary embodiment, the composition further comprises at least one bicyclic oxazolidine BCO. Exemplary bicyclic oxazolidine BCO include those having a structure according to formula (VI)

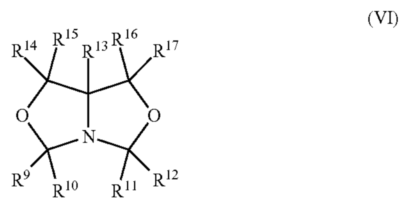

wherein $R^9$, $R^{10}$, $R^{11}$ and $R^{12}$ are, individually, a linear or branched alkyl group, for example, with 1 to 8 carbon atoms, or a linear or branched hydroxy alkyl group, for example, with 1 to 8 carbon atoms, or an aryl group or a cycloalkyl group, for example, with 6 to 12 carbon atoms;

$R^{13}$ is H or a linear or branched alkyl group, for example, with 1 to 8 carbon atoms, or a linear or branched hydroxy alkyl group, for example, with 1 to 8 carbon atoms;

$R^{14}$, $R^{15}$, $R^{16}$ and $R^{17}$ are, individually, H or a linear or branched alkyl group, for example, with 1 to 8 carbon atoms, or a linear or branched hydroxy alkyl group, for example, with 1 to 8 carbon atoms.

In an exemplary embodiment, $R^9$ and $R^{11}$ are H.

The bicyclic oxazolidine BCO can be prepared in any suitable manner including, for example, in accordance with the method of preparing and details of the products formed in U.S. Pat. No. 5,126,421 and International Publication No. WO 96/08308 A1, the entire disclosures of which is hereby incorporated by reference.

An exemplary bicyclic oxazolidine BCO includes the compound 1-aza-3,7-dioxo-2,8-diisopropyl-5-ethyl bicyclo[3,3,0]octane, available under the tradename ZOLDINE® RD-20 from Angus Chemical Company (Buffalo Grove, USA) and has a structure of formula (VI) in which $R^9$, $R^{11}$, $R^{14}$, $R^{15}$, $R^{16}$ and $R^{17}$ are all H; $R^{10}$ and $R^{12}$ are an isopropyl group and $R^{13}$ is an ethyl group.

For example, the amount of all polyoxazolidines POC and all of the optionally present bicyclic oxazolidines BCO and the sum of all polyoxazolidines POU is 80-100% by weight, for example, 90-100% by weight, for example, 95-100% by weight, with regard to the weight of the total composition.

The weight ratio of the sum of all polyoxazolidines POC to the sum of all polyoxazolidines POU can be, for example, 5:95-95:5, for example, 10:90-45:55, for example, 25:75-35:65.

In an exemplary embodiment, the composition is used as a curing agent which is suitable for adding to polyisocyanates or polyurethanes. In this embodiment, the composition can consist essentially of, for example, consist only of, polyoxazolidine(s) POC, polyoxazolidine(s) POU and optionally bicyclic oxazolidines(s) BCO. For example, the composition does not have any solvents, as ingredients. Such curing agent compositions can be liquid at room temperature and have in comparison with the polyoxazolidine(s) POU a distinctly reduced tendency to crystallize. These compositions can have remarkably better storage and transport properties and can need less expensive storage equipment or application equipment and are, therefore, very advantageous.

Said compositions can be advantageous over existing polyoxazolidines in that, for example, a broad range of non-crystallizing curing agents can now be offered, allowing tailoring the curing properties to the customers' needs, for example, by also using polyoxazolidine(s) POU which are otherwise prone to crystallization when used as such.

A further exemplary aspect relates to the use of the composition as described before as a non-crystallizing curing agent for polyisocyanates.

In a further exemplary embodiment, the composition as described before further comprises a polyisocyanate, for example, a polymer having at least two NCO groups. In other words, this embodiment of the composition corresponds to the composition according to the first embodiment, which has been added to a polyisocyanate or polyurethane composition.

In this embodiment, the amount of all polyoxazolidines POC and bicyclic oxazolidines BCO and the sum of all polyoxazolidines POU can be 5-20% by weight, for example, 5-15% by weight, for example, 6-10% by weight, in regard to the weight of the total composition.

As additional polyisocyanates for this embodiment, those polyisocyanates can be used that have been described above for the manufacture of polyoxazolidine POU having at least two urethane groups.

Furthermore, polyurethane prepolymers carrying isocyanate groups can be used as additional polyisocyanates. These polyurethane prepolymers can be prepared from the above mentioned polyisocyanates and polyols.

Polyols suited for the preparation of polyurethane prepolymers can be selected from, for example:

polyetherpolyols, also known as polyoxyalkylenepolyols or oligoetherols, which are polymerization products of ethylene oxide, 1,2-propylene oxide, 1,2- or 2,3-butylene oxide, oxetane, tetrahydrofuran or mixtures thereof, possibly polymerized with the aid of a initiator molecule with two or more active hydrogen atoms, for example water, ammonia or compounds having a plurality of OH or NH groups, for example 1,2-ethanediol, 1,2- and 1,3-propanediol, neopentyl glycol, diethylene glycol, triethylene glycol, the isomeric dipropylene glycols and tripropylene glycols, the isomeric butanediols, pentanediols, hexanediols, heptanediols, octanediols, nonanediols, decanediols, undecanediols, 1,3- and 1,4-cyclohexanedimethanol, bisphenol A, hydrogenated bisphenol A, 1,1,1-trimethylolethane, 1,1,1-trimethylolpropane, glycerol, aniline, and mixtures of the compounds mentioned. It is possible to use either polyoxyalkylenepolyols which have a low degree of unsaturation (measured to ASTM D-2849-69 and reported in milliequivalents of unsaturation per gram of polyol (meq/g)), prepared, for example, with the aid of double metal cyanide complex catalysts (DMC catalysts), or polyoxyalkylenepolyols with a higher degree of unsaturation, prepared, for example, with the aid of anionic catalysts such as NaOH, KOH, CsOH or alkali metal alkoxides.

Suitable are polyoxyethylenepolyols and polyoxypropylenepolyols, for example, polyoxyethylenediols, polyoxypropylenediols, polyoxyethylenetriols and polyoxypropylenetriols.

Suitable are polyoxyalkylenediols or polyoxyalkylenetriols having a degree of unsaturation lower than 0.02 meq/g and having a molecular weight in the range from 1000 to 30 000 g/mol, and also polyoxyethylenediols, polyoxyethylenetriols, polyoxypropylenediols and polyoxypropylenetriols with a molecular weight of 400 to 8000 g/mol. "Molecular weight" or "molar mass" is understood in the present document always to mean the molecular weight average $M_n$.

Suitable are so-called ethylene oxide-terminated ("EO-endcapped", ethylene oxide-endcapped) polyoxypropylenepolyols. The latter are specific polyoxypropylenepolyoxyethylenepolyols which are obtained, for example, by further alkoxylating pure polyoxypropylenepolyols, for example, polyoxypro-pylenediols and -triols, with ethylene oxide on completion of the polypropoxylation reaction, and have primary hydroxyl groups as a result. Preference can be given in this case to polyoxypropylenepolyoxyethylenediols and polyoxypropylenepolyoxyethylenetriols.

Styrene-acrylonitrile- or acrylonitrile-methyl methacrylate-grafted polyether-polyols.

PolCterpolyols, also known as oligoesterols, prepared, for example, from di- to trihydric alcohols, for example 1,2-ethanediol, diethylene glycol, 1,2-propanediol, dipropylene glycol, 1,4-butanediol, 1,5-pentanediol, 1,6-hexanediol, neopentyl glycol, glycerol, 1,1,1-trimethylolpropane or mixtures of the aforementioned alcohols, with organic dicarboxylic acids or the anhydrides or esters thereof, for example succinic acid, glutaric acid, adipic acid, suberic acid, azelaic acid, sebacic acid, dodecanedicarboxylic acid, maleic acid, fumaric acid, phthalic acid, isophthalic acid, terephthalic acid and hexahydro-phthalic acid, or mixtures of the aforementioned acids, and also polCterpolyols formed from lactones, for example from $\epsilon$-caprolactone.

Polycarbonatepolyols, as obtainable by reaction, for example, of the abovementioned alcohols—used to form the polyesterpolyols—with dialkyl carbonates, diaryl carbonates or phosgene.

Polyacrylate- and polymethacrylatepolyols.

Poly-hydroxy-functional fats and oils, for example natural fats and oils, for example, castor oil; or polyols—known as oleochemical polyols—obtained by chemical modification of natural fats and oils, for example the epoxy polCters or epoxy polyethers obtained by epoxidation of unsaturated oils and subsequent ring opening with carboxylic acids or alcohols, or polyols obtained by hydroformylation and hydrogenation of unsaturated oils; or polyols obtained from natural fats and oils by degradation processes such as alcoholysis or ozonolysis and subsequent chemical linkage, for example by transesterification or dimerization, of the degradation products or derivatives thereof thus obtained. Suitable degradation products of natural fats and oils are, for example, fatty acids and fatty alcohols, and also fatty acid esters, for example, the methyl esters (FAME), which can be derivatized, for example, by hydroformylation and hydrogenation to hydroxy fatty acid esters.

Polyhydrocarbonpolyols, also known as oligohydrocarbonols, for example poly-hydroxy-functional ethylene-propylene, ethylene-butylene or ethylene-propylene-diene copolymers, as produced, for example, by Kraton Polymers, or poly-hydroxy-functional copolymers of dienes such as 1,3-butadiene or diene mixtures, and vinyl monomers such as styrene, acrylonitrile or isobutylene, or poly-hydroxy-functional polybutadienepolyols, for example those which are prepared by copolymerization of 1,3-butadiene and allyl alcohol and may also be hydrogenated.

Poly-hydroxy-functional acrylonitrile/butadiene copolymers, as can be prepared, for example, from epoxides or amino alcohols and carboxyl-terminated acrylonitrile/butadiene copolymers (commercially available under the Hypro® CTBN (formerly Hycar® CTBN) name from Noveon).

These polyols mentioned can have a mean molecular weight of 250-30 000 g/mol, for example, 1000-30 000 g/mol, and can have a mean OH functionality in the range from 1.6 to 3.

Suitable polyols are polCterpolyols and polyetherpolyols, for example, polyoxyethylenepolyol, polyoxypropylenepolyol and polyoxypropylenepolyoxy-ethylenepolyol, for example, polyoxyethylenediol, polyoxypropylenediol, polyoxy-ethylenetriol, polyoxypropylenetriol, polyoxypropylenepolyoxyethylenediol and polyoxypropylenepolyoxyethylenetriol.

In addition to these polyols mentioned, small amounts of low molecular weight di- or polyhydric alcohols, for example, 1,2-ethanediol, 1,2- and 1,3-propanediol, neopentyl glycol, diethylene glycol, triethylene glycol, the isomeric dipropylene glycols and tripropylene glycols, the isomeric butanediols, pentanediols, hexanediols, heptanediols, octanediols, nonanediols, decanediols, undecanediols, 1,3- and 1,4-cyclohexanedimethanol, hydrogenated bisphenol A, dimeric fatty alcohols, 1,1,1-trimethylolethane, 1,1,1-trimethylolpropane, glycerol, pentaerythritol, sugar alcohols such as xylitol, sorbitol or mannitol, sugars such as sucrose, other higher polyhydric alcohols, low molecular weight alkoxylation products of the aforementioned di- and polyhydric alcohols, and mixtures of the aforementioned alcohols, can be used additionally in the preparation of the polyurethane prepolymer.

These compositions may further comprise other ingredients such as filler, adhesion promoters, stabilizers, thixotropic agents, curing catalysts and other additives which are known to the person skilled in the art of polyurethane compositions.

The filler can influence both the rheological properties of the uncured composition, and the mechanical properties and the surface properties of the cured composition. Suitable fillers are inorganic and organic fillers, for example natural, ground or precipitated calcium carbonates which are optionally coated with fatty acids, for example, stearates, barium sulfate ($BaSO_4$, also known as barite or heavy spar), calcined kaolins, quartz flour, aluminum oxides, aluminum hydroxides, silicas, for example, high-dispersity silicas from pyrolysis processes, carbon blacks, for example, industrially produced carbon black, PVC powders or hollow spheres. Exemplary fillers are barium sulfate and calcium carbonates, carbon black and flame-retardant fillers such as hydroxides or hydrates, for example, hydroxides or hydrates of aluminum, for example, aluminum hydroxide.

These compositions can cure very rapidly and can have advantages, for example, in that the curing behaviour can be easily varied by the choice of the structures of polyoxazolidine(s) PUC and polyoxazolidine(s) POC.

The compositions can be used in a broad scope of applications, for example, as coatings, adhesives, sealants, as compositions for flooring or for molding.

These compositions can be suited to be used in the field of repair, civil engineering and industrial manufacturing of goods, for example, in the manufacturing of vehicles such as cars.

EXAMPLES

The following examples serve to illustrate the aspects described above.

Synthesis of 2-(2-isopropyloxazolidin-3-yl)ethanol (i-Pr-OE)

1495.07 g (14.2 moles) diethanolamine and 400 g of light petroleum naphtha solvent were added to a 5 liter reaction flask equipped with a stirrer and reflux condenser. The mixture was heated to 40° C. using a heating mantle and 1104.9 g (15.3 moles) of isobutyraldehyde slowly added over a period of 1 hour, whilst maintaining the reaction temperature below 60° C. Once all of the isobutyraldehyde had been added, Dean and Stark apparatus was added to the reaction vessel and the mixture heated to 85° C. The reaction was maintained between 80-85° C. until 254.3 g of water had distilled off. The reaction temperature was then raised to 125° C. and the solvent and excess isobutyraldehyde distilled off under reduced pressure (approx. 0.8 bar).

The resultant 2-(2-isopropyloxazolidin-3-yl)ethanol (i-Pr-OE) was isolated as a yellow oil with a purity of 97.1% (determined by GC).

Synthesis of Polyoxazolindine POU-1

994.6 g (6.3 moles) of 2-(2-isopropyloxazolidin-3-yl)ethanol (i-Pr-OE) and 0.12 g DBTDL catalyst were added to a 1 liter reaction vessel. 335.5 g (1.9 moles) of toluene diisocyanate (Desmophen T80) (a 80:20 mixture of 2,4- and 2,6-toluene diisocyanate) was added dropwise over a 2 hour period. The reaction mixture was held at 90-100° C. for 1.5-2 hours using gentle heating. End of reaction was determined by IR analysis and the disappearance of the NCO peak at 2275 $cm^{-1}$. The final bis-oxazolidine product POU-1 was isolated as a viscous pale yellow liquid with a viscosity of 21.4 Pa·s (214 P) determined by Brookfield at 20° C.

Synthesis of Polyoxazolindine POC-1

1081.98 g (6.8 moles) of 2-(2-isopropyloxazolidin-3-yl) ethanol (i-Pr-OE), 912.9 g (10.1 moles) dimethyl carbonate and 5.12 g of potassium tert-butoxide were added to a 2 liter reaction flask equipped with a reflux condenser and heated to 80° C. The transesterification was carried out for 6 hours at 80-100° C. under nitrogen after which the batch was set-up for reflux and the methanol removed between 80-130° C. 112.3 g methanol was collected. Excess mass collected was attributed to excess dimethyl carbonate. The final bis-oxazolidine POC-1 was isolated as a free flowing yellow liquid with a viscosity of 48.2 mPa·s (48.2 cP) (method used see above: synthesis of POU-1) with a purity of 77% (determined by GC).

Synthesis of Polyoxazolidine POU-2

668.8 g (4.2 moles) of 2-(2-isopropyloxazolidin-3-yl)ethanol (i-Pr-OE) and 0.08 g DBTDL catalyst were added to a 1 liter reaction vessel. 331.1 g (2.0 moles) of hexamethylene 1,6-diisocyanate (HDI) was added dropwise over a 1.5 hour period whilst maintaining the reaction temperature below 100° C. The reaction mixture was then held at 90-100° C. for 2 hours using gentle heating. End of reaction was determined by IR analysis and the disappearance of the NCO peak at 2275 $cm^{-1}$. The final bis-oxazolidine product POU-2 was isolated as a viscous yellow liquid with a viscosity of 15.4 Pa·s (154 P) (method used see above: synthesis of POU-1).

Storage Stability Tests

The polyoxazolidines respectively the mixtures (being prepared by mixing the two polyoxazolidines in the mixing ratio indicated in table 1 in a mixing vessel under nitrogen during 30 minutes at 60° C.) were tested in view of their storage stability, respectively on their tendency to crystallize.

For this the examples of comparison (Ref. 1, Ref. 2 and Ref. 3) as well as the examples (1, 2, 3 and 4) are individually stored in sealed containers at 4° C. and at −12.5° C. The samples were checked regularly to determine whether or not they have crystallized. In table 1 it was indicated if the sample has been crystallized ("C") or not crystallized ("NC") or partly crystallized ("PC")

In a further series of experiment a few crystals of POU-2 were added initially as crystallization seeds to each of the different samples and the crystallization behaviour was checked analogously.

TABLE 1 compositions and storage stability

| | Ref. 1 | Ref. 2 | 1 | 2 | 3 | 4 | 5 |
|---|---|---|---|---|---|---|---|
| POU-1 [% by weight] | 100 | | 90 | 80 | 75 | 65 | |
| POU-2 [% by weight] | | 100 | | | | | 80 |
| POC-1 [% by weight] | | | 10 | 20 | 25 | 35 | 20 |
| Storage Stability non-seeded | | | | | | | |
| 1 day at 4° C. | C | C | NC | NC | NC | NC | NC |
| 1 week at 4° C. | C | C | NC | NC | NC | NC | NC |
| 2 weeks at 4° C. | C | C | NC | NC | NC | NC | NC |
| 1 month at 4° C. | C | C | NC | NC | NC | NC | PC |
| 6 months at 4° C. | C | C | NC | NC | NC | NC | C |
| 12 months at 4° C. | C | C | NC | NC | NC | NC | C |
| 1 day at −12.5° C. | C | C | NC | NC | NC | NC | NC |
| 1 week at −12.5° C. | C | C | NC | NC | NC | NC | PC |
| 2 weeks −12.5° C. | C | C | NC | NC | NC | NC | C |
| 1 month −12.5° C. | C | C | NC | NC | NC | NC | C |
| 6 months −12.5° C. | C | C | NC | NC | NC | NC | C |
| 12 months −12.5° C. | C | C | NC | NC | NC | NC | C |
| seeded | | | | | | | |
| 1 day at 4° C., seeded | C | C | NC | NC | NC | NC | NC |
| 1 week at 4° C., seeded | C | C | NC | NC | NC | NC | PC |
| 2 weeks at 4° C., seeded | C | C | NC | NC | NC | NC | C |
| 1 month at 4° C., seeded | C | C | NC | NC | NC | NC | C |
| 6 months at 4° C., seeded | C | C | NC | NC | NC | NC | C |
| 12 months at 4° C., seeded | C | C | NC | NC | NC | NC | C |
| 1 day at −12.5° C., seeded | C | C | NC | NC | NC | NC | NC |
| 1 week at −12.5° C., seeded | C | C | NC | NC | NC | NC | C |
| 2 weeks −12.5° C., seeded | C | C | NC | NC | NC | NC | C |
| 1 month −12.5° C., seeded | C | C | NC | NC | NC | NC | C |

TABLE 1-continued

| compositions and storage stability | | | | | | | |
|---|---|---|---|---|---|---|---|
| | Ref. 1 | Ref. 2 | 1 | 2 | 3 | 4 | 5 |
| 6 months −12.5° C., seeded | C | C | NC | NC | NC | NC | C |
| 12 months −12.5° C., seeded | C | C | NC | NC | NC | NC | C |

The results of table 1 show that the examples 1, 2 and 3 have a much better storage stability as compared to the polyoxazolidines having at least two urethane groups alone (Ref. 1 and Ref. 2).

It will be appreciated by those skilled in the art that the present invention can be embodied in other specific forms without departing from the spirit or essential characteristics thereof. The presently disclosed embodiments are therefore considered in all respects to be illustrative and not restricted. The scope of the invention is indicated by the appended claims rather than the foregoing description and all changes that come within the meaning and range and equivalence thereof are intended to be embraced therein.

What is claimed is:

1. A composition, comprising:

a) at least one polyoxazolidine POU having at least two urethane groups; and b) at least one polyoxazolidine POC having at least one carbonato group, wherein the polyoxazolidine POU comprises a bis-oxazolidine of formula (IV')

(IV')

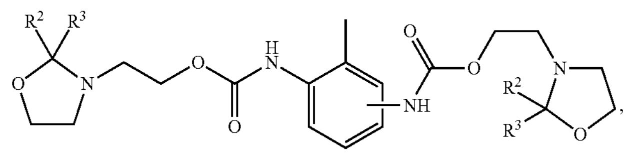

wherein $R^2$ and $R^3$ are independently from each other H or a linear or branched alkyl group with 1 to 10 carbon atoms wherein the polyoxazolidines POC comprises a bis-oxazolidine of the formula (V):

(V)

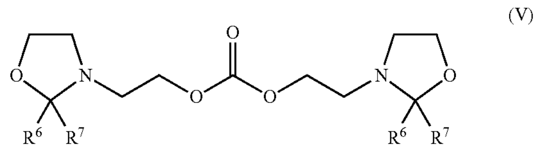

wherein $R^6$ and $R^7$ are independently from each other H or a linear or branched alkyl group with 1 to 10 carbon atoms;

and wherein the weight ratio of the sum of all polyoxazolidine POC to the sum of all polyoxazolidine POU is 10:90-45:55.

2. The composition according to claim 1, wherein the polyoxazolidine POC has a structure according to formula (II):

(II)

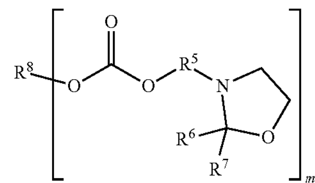

wherein $R^5$ is an alkylene group with 2 to 5 carbon atoms;

$R^6$ and $R^7$ are, individually, H or a linear or branched alkyl group with 1 to 6 carbon atoms or an aryl group which is optionally substituted;

m=1, 2, 3, 4, 5 or 6;

$R^8$ is a m-valent residue of a molecular weight of 15-1000 g/mol.

3. The composition according to claim 1, wherein $R^2$ and $R^6$ are H.

4. The composition according to claim 1, wherein the composition further comprises at least one bicyclic oxazolidine BCO.

5. The composition according to claim 4, wherein the bicyclic oxazolidine BCO has a structure according to formula (VI):

(VI)

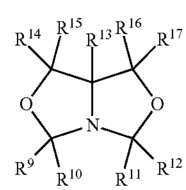

wherein $R^9$, $R^{10}$, $R^{11}$ and $R^{12}$ are, individually, a linear or branched alkyl group, or a linear or branched hydroxy alkyl group, or an aryl group or a cycloalkyl group;

$R^{13}$ is H or a linear or branched alkyl group, or a linear or branched hydroxy alkyl group;

$R^{14}$, $R^{15}$, $R^{16}$ and $R^{17}$ are, individually, H or a linear or branched alkyl group, or a linear or branched hydroxy alkyl group.

6. The composition according to claim 1, wherein the amount of all polyoxazolidines POC and all of optionally present bicyclic oxazolidines BCO and the sum of all polyoxazolidines POU is 80-100% by weight, in regard to the weight of the total composition.

7. The composition according to claim 1, wherein the weight ratio of the sum of all polyoxazolidines POC to the sum of all polyoxazolidines POU is 5:95-95:5.

8. The composition according to claim 1, wherein the composition further comprises a polyisocyanate that is a polymer having at least two NCO groups.

9. The composition according to claim 8, wherein the amount of all polyoxazolidines POC and optionally present bicyclic oxazolidines BCO and the sum of all polyoxazolidines POU is 5-20% by weight, in regard to the weight of the total composition.

10. A method of using a composition as a non-crystallizing curing agent of a polyisocyanate, the method comprising adding a composition to a polyisocyanate, wherein the composition comprises:

a) at least one polyoxazolidine POU having at least two urethane groups; and b) at least one polyoxazolidine POC having at least one carbonato group, wherein the polyoxazolidine POU comprises a bis-oxazolidine of formula (IV')

(IV')

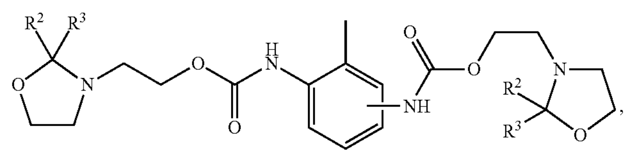

wherein $R^2$ and $R^3$ are independently from each other H or a linear or branched alkyl group with 1 to 10 carbon atoms wherein the polyoxazolidines POC comprises a bis-oxazolidine of the formula (V):

(V)

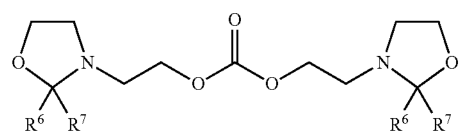

wherein $R^6$ and $R^7$ are independently from each other H or a linear or branched alkyl group with 1 to 10 carbon atoms;

and wherein the weight ratio of the sum of all polyoxazolidine POC to the sum of all polyoxazolidine POU is 10:90-45:55.

11. The composition according to claim 2, wherein in formula (II), $R^5$ is an ethylene group.

12. The composition according to claim 2, wherein in formula (II), m=2.

13. The composition according to claim 2, wherein in formula (II), $R^8$ carries a substituent of the formula (III):

(III)

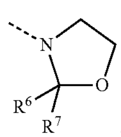

14. The composition according to claim 1, wherein the polyoxazolidine POC has a structure according to formula (IIa):

(IIa)

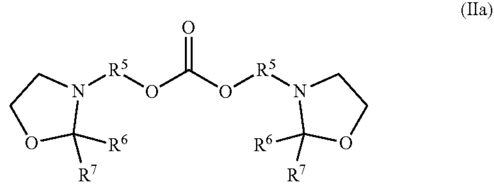

wherein $R^5$ is an alkylene group with 2 carbon atoms;

$R^6$ and $R^7$ are, individually, H or a linear or branched alkyl group with 1 to 6 carbon atoms or an aryl group which is optionally substituted.

15. The composition according to claim 1, wherein in the polyoxazolidine POC, at least one of $R^6$ and $R^7$ is a linear or branched alkyl group with 1 to 10 carbon atoms or an aryl group, which is substituted with a methyl, ethyl or isopropyl group.

16. The composition according to claim 1, wherein in formulas (IV') and (V), $R^2$, $R^3$, $R^6$ and $R^7$ are independently from each other a methyl, ethyl or isopropyl group.

17. The composition according to claim 1, wherein in formulas (IV') and (V), at least one of $R^2$, $R^3$, $R^6$ and $R^7$ is an isopropyl group.

18. The composition according to claim 5, wherein in formula (VI), $R^9$, $R^{10}$, $R^{11}$ and $R^{12}$ are, individually, a linear or branched alkyl group with 1 to 8 carbon atoms, or a linear or branched hydroxy alkyl group with 1 to 8 carbon atoms, or an aryl group or a cycloalkyl group with 6 to 12 carbon atoms;

$R^{13}$ is H or a linear or branched alkyl group with 1 to 8 carbon atoms, or a linear or branched hydroxy alkyl group with 1 to 8 carbon atoms;

$R^{14}$, $R^{15}$, $R^{16}$ and $R^{17}$ are, individually, H or a linear or branched alkyl group with 1 to 8 carbon atoms, or a linear or branched hydroxy alkyl group with 1 to 8 carbon atoms.

19. The composition according to claim 1, wherein the amount of all polyoxazolidines POC and all of optionally present bicyclic oxazolidines BCO and the sum of all polyoxazolidines POU is 90-100% by weight, in regard to the weight of the total composition.

20. The composition according to claim 1, wherein the amount of all polyoxazolidines POC and all of optionally present bicyclic oxazolidines BCO and the sum of all polyoxazolidines POU is 95-100% by weight, in regard to the weight of the total composition.

21. The composition according to claim 1, wherein the weight ratio of the sum of all polyoxazolidines POC to the sum of all polyoxazolidines POU is 25:75-35:65.

22. The composition according to claim 8, wherein the amount of all polyoxazolidines POC and optionally present bicyclic oxazolidines BCO and the sum of all polyoxazolidines POU is 5-15% by weight, in regard to the weight of the total composition.

23. The composition according to claim 8, wherein the amount of all polyoxazolidines POC and optionally present bicyclic oxazolidines BCO and the sum of all polyoxazolidines POU is 6-10% by weight, in regard to the weight of the total composition.

24. A composition, consisting essentially of:

a) at least one polyoxazolidine POU having at least two urethane groups, wherein the at least one polyoxazolidine POU comprises a bis-oxazolidine of formula (IV')

(IV')

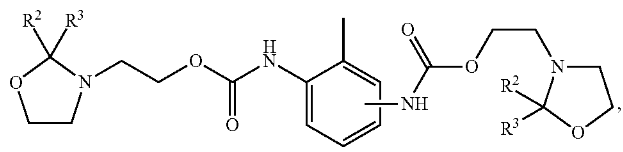

wherein $R^2$ and $R^3$ are independently from each other H or a linear or branched alkyl group with 1 to 10 carbon atoms; and b) at least one polyoxazolidine POC having at least one carbonato group, wherein the at least one polyoxazolidine POC has a monocyclic structure wherein the polyoxazolidine POC comprises a bis-oxazolidine of the formula (V):

(V)

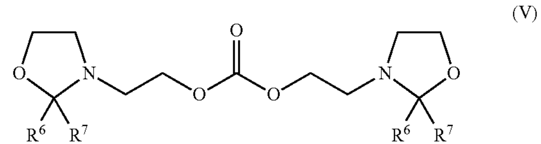

wherein $R^6$ and $R^7$ are independently from each other H or a linear or branched alkyl group with 1 to 10 carbon atoms;

and wherein the weight ratio of the sum of all polyoxazolidine POC to the sum of all polyoxazolidine POU is 10:90-45:55.

* * * * *